(No Model.) 5 Sheets—Sheet 2.
W. R. BAKER.
MOWER.

No. 425,016. Patented Apr. 8, 1890.

Witnesses
Wm A. Skinkle
Geo. W. Young.

Inventor
William R. Baker.
By his Attorneys
Parkinson & Parkinson (No Model.) 5 Sheets—Sheet 3.
W. R. BAKER.
MOWER.

No. 425,016. Patented Apr. 8, 1890.

Witnesses
Wm A Skinkle
Geo. W. Young.

Inventor
William R. Baker.
By his Attorneys
Parkinson & Parkinson (No Model.)  5 Sheets—Sheet 4.

W. R. BAKER.
MOWER.

No. 425,016.  Patented Apr. 8, 1890.

Witnesses
Wm. A. Skinkle
Geo. W. Young.

Inventor
William R. Baker
By his Attorneys
Parkinson & Parkinson (No Model.) 5 Sheets—Sheet 5.

W. R. BAKER.
MOWER.

No. 425,016. Patented Apr. 8, 1890.

Witnesses
Wm A Skinkle
Geo. W. Young.

Inventor
William R. Baker.
By his Attorneys
Rasmussen & Rasmussen

UNITED STATES PATENT OFFICE.

WILLIAM R. BAKER, OF CHICAGO, ILLINOIS, ASSIGNOR TO THE McCORMICK HARVESTING MACHINE COMPANY, OF SAME PLACE.

MOWER.

SPECIFICATION forming part of Letters Patent No. 425,016, dated April 8, 1890.

Application filed March 12, 1887. Serial No. 230,589. (No model.)

*To all whom it may concern:*

Be it known that I, WILLIAM R. BAKER, a citizen of the United States, residing at Chicago, in the county of Cook and State of Illinois, have invented certain new and useful Improvements in Mowers, of which the following is a specification.

My invention relates, primarily, to two-wheeled hinged-bar front-cut mowers, although certain of its features are applicable to rear-cut mowers or to any type of mowers, whether one wheel or two or front or rear cut; and it consists, first, in the employment of means whereby the finger-beam may be tilted up and down and locked in any position or may be allowed to float, at the will of the driver; second, in combining with the tilting-lever an eccentric rack and locking-pawl, and means whereby said pawl may be adjusted as to the distance to which it will be permitted to fall, whereby it may lock into any of the interdental spaces to hold the finger-bar rigidly against rocking, or else may escape one or more of the teeth of the rack, thereby permitting the finger-bar to rock freely a limited distance, but retaining the points of the guard-fingers at a fixed minimum distance from the ground, or else may escape all of the teeth, permitting the finger-bar to rock uncontrolled except by the irregularities of the ground; third, in combining with the thrust-bar a clevis hinged to the opposite side of the draft-tongue and extended horizontally thereacross, a link connecting the thrust-bar with the free end of the clevis and a whiffletree adjustable along said clevis, to relieve side draft, and, fourth, in forming the shipper-yoke for the clutch-pinion as a case with a cap for the end of the pinion, whereby the pressure to keep the pinion in engagement with its opposing clutch-face will be imparted through said cap instead of to the groove in the hub of the pinion.

Figure 1:
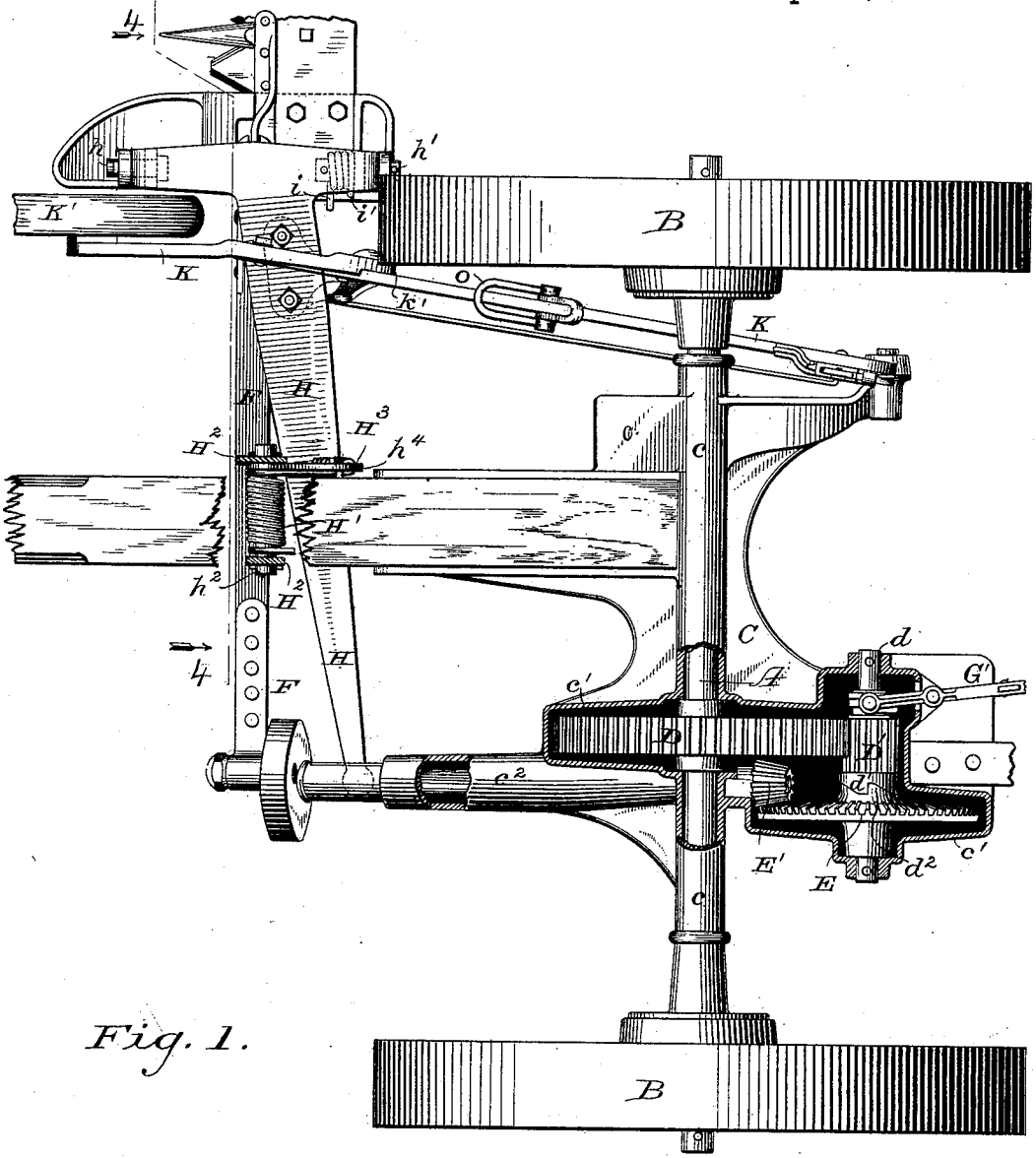
Figure 2:
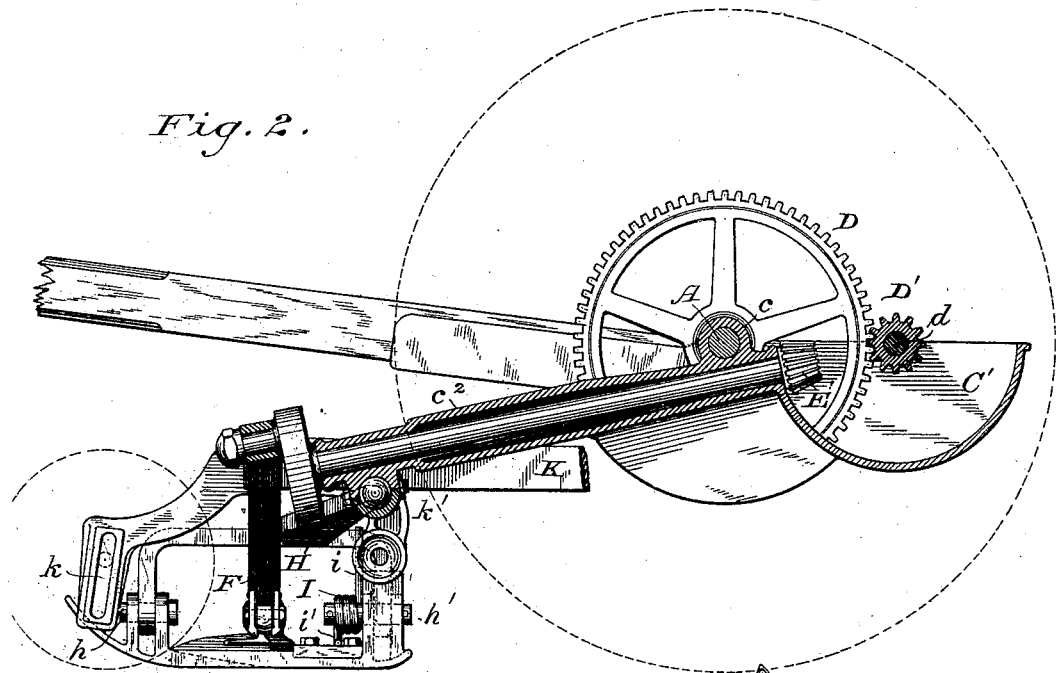
Figure 3:
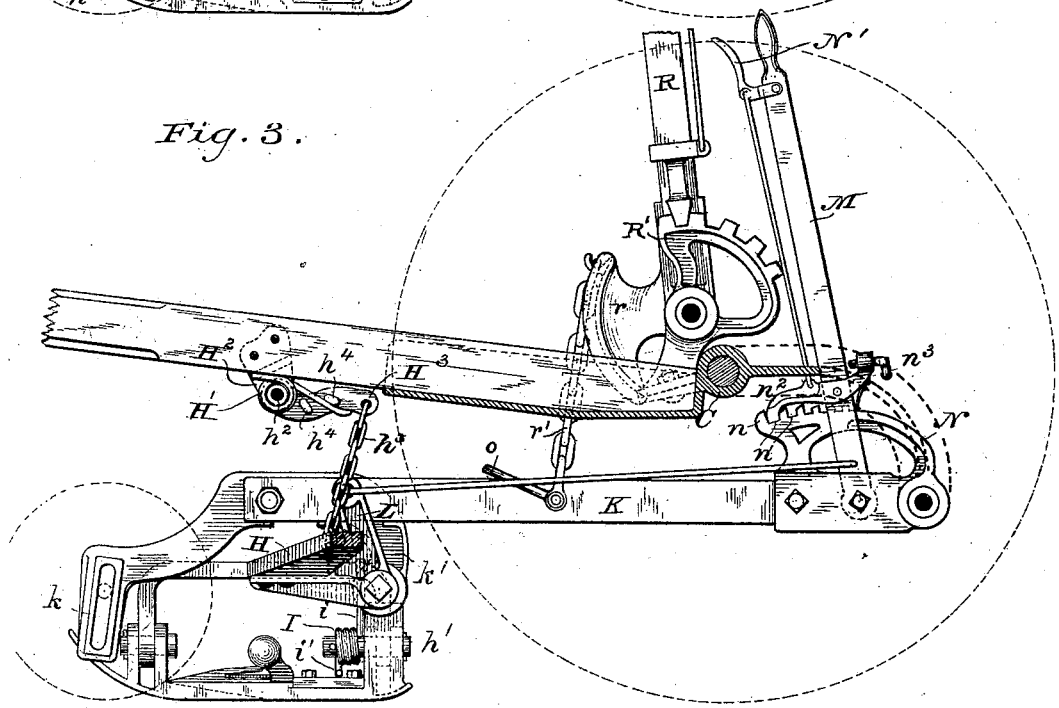
Figure 4:
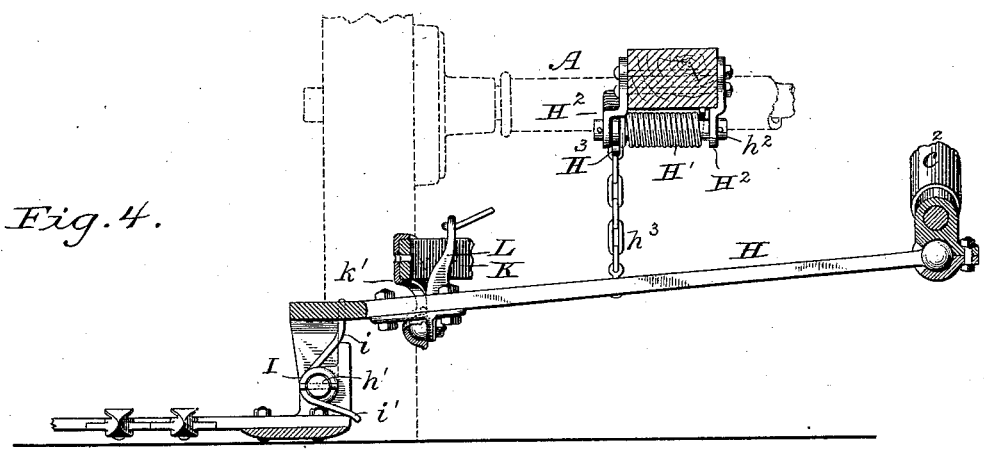
Figure 5:
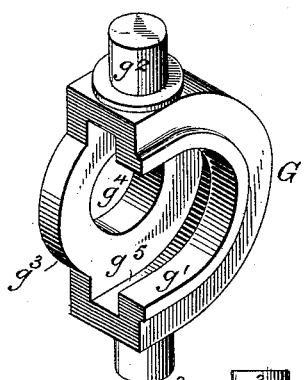
Figure 8:
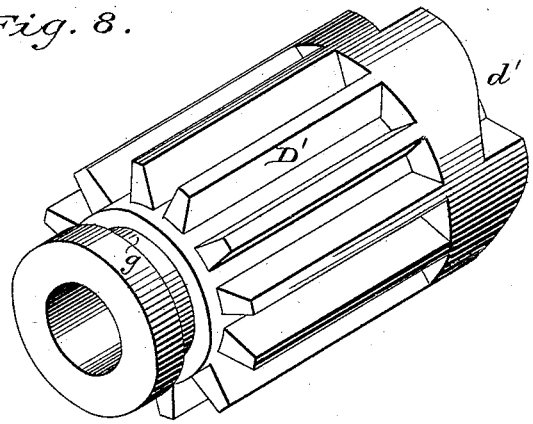
Figure 6:
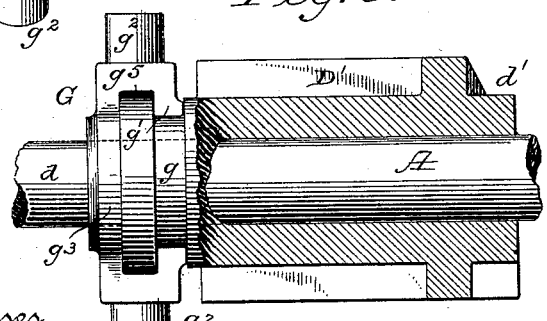
Figure 7:
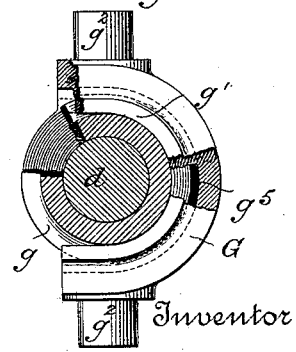
Figure 9:
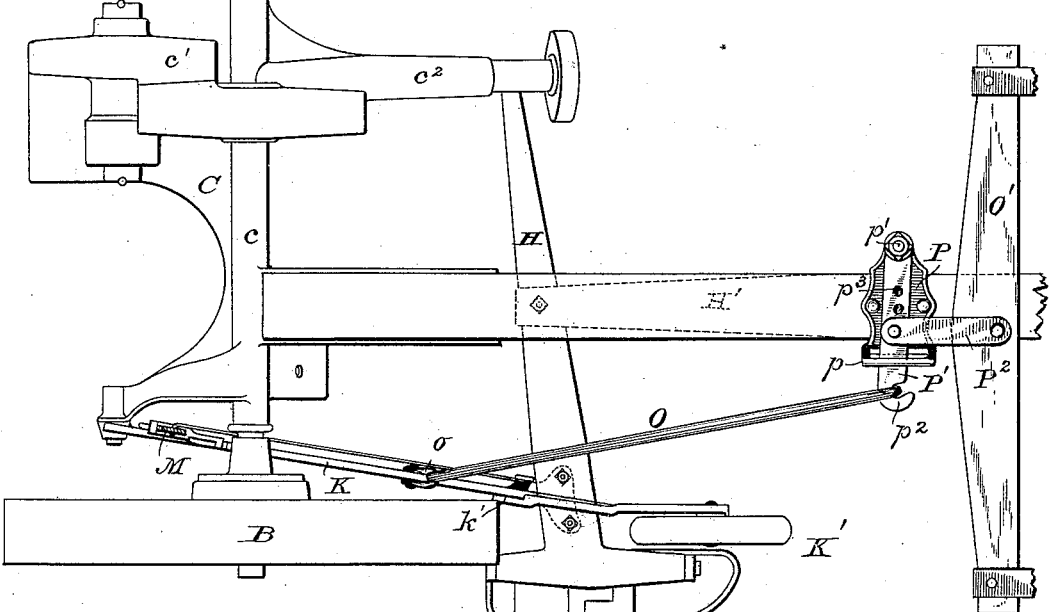
Figure 10:
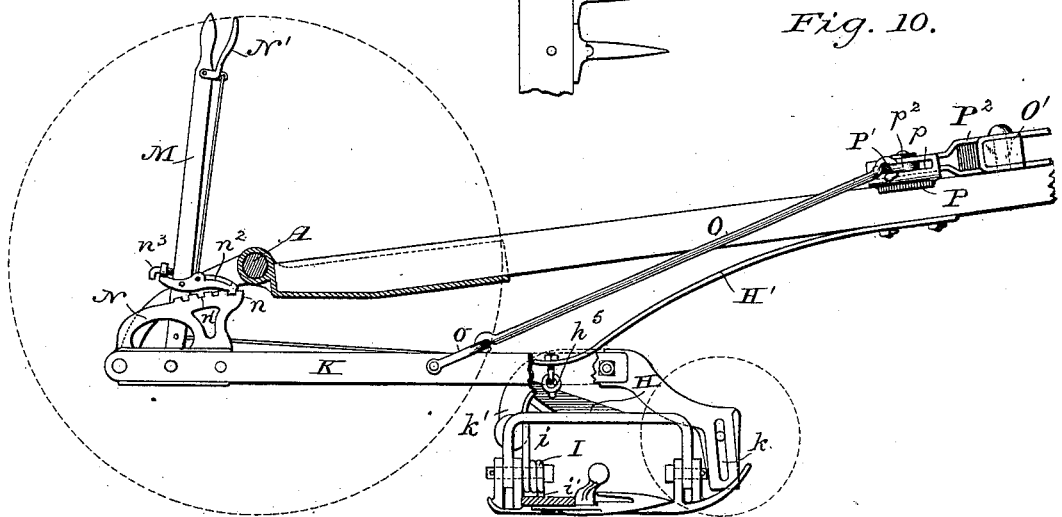
Figure 12:
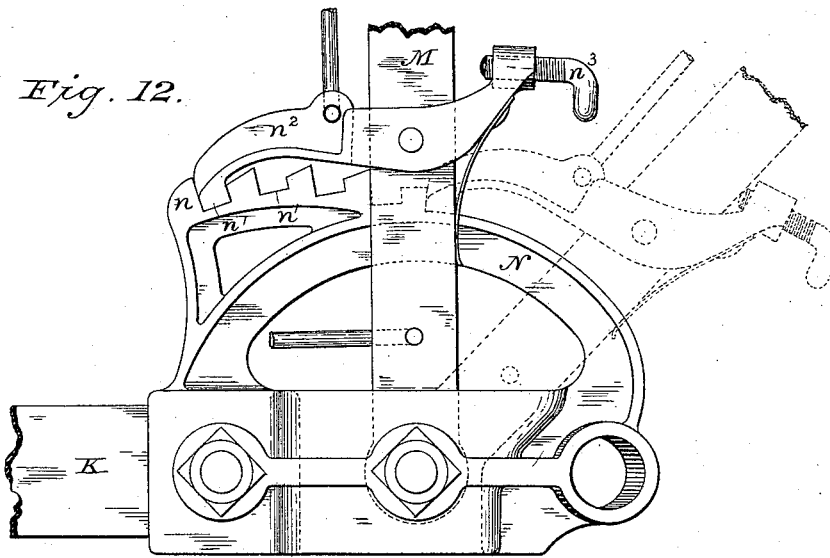
Figure 11:
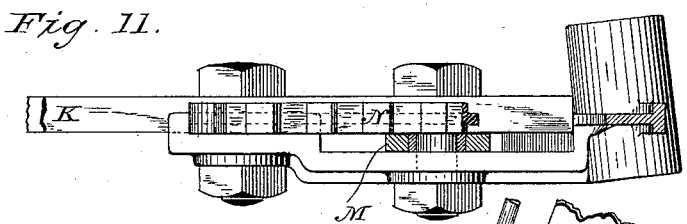
Figure 13:
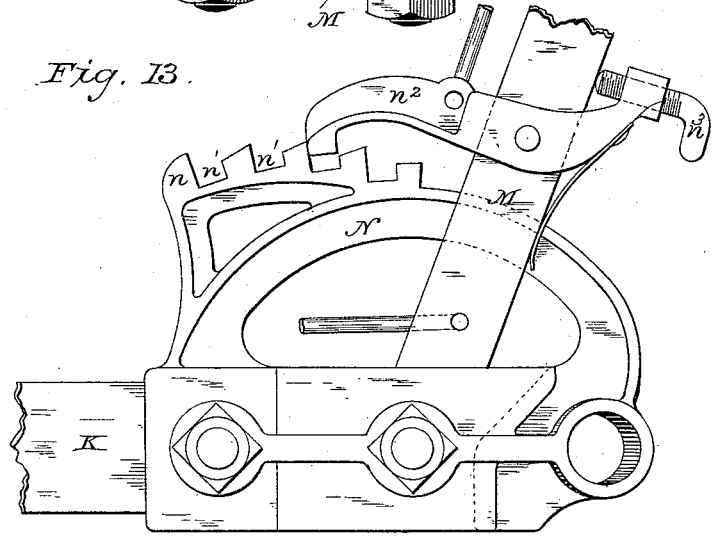

In the drawings, Figure 1 is a top plan view of a mower embodying my invention, the tongue and gear-case being partly broken away to expose operative parts of the mechanism. Fig. 2 is a side elevation, partly in vertical section, through the crank-shaft sleeve and gear-case; Fig. 3, a second side elevation in section on a line about centrally of the machine, and, as in the preceding figure, looking toward the finger-bar; Fig. 4, a transverse vertical section on the correspondingly-numbered line in Fig. 1 and seen in the direction of the arrows; Figs. 5, 6, 7, and 8, enlarged details of the shipper-yoke and clutch-pinion; Fig. 9, a top plan view of the mower, omitting the seat and lifting-lever and having the outer ends of the draft-tongue and finger-bar broken away, but otherwise whole, intended to illustrate a modification of the easing-spring and explain the operation of the draft-clevis; Fig. 10, a side elevation, in section and partly broken away, through the machine represented in the preceding figure; Figs. 11, 12, and 13, enlarged details of the tilting-lever, its rack, and detent-pawl.

A represents the axle of the mower, and B the carrying-wheels, one at each end of said axle.

C is the main frame, generally formed as a single casting, with the sleeve $c$ receiving and protecting the axle and with a gear-box $c'$, and also with a forwardly-extending sleeve $c^2$ for the crank-shaft, which in the present instance passes beneath the axle. A large spur-gear D, pinned or keyed to the axle within the gear-case, engages in rear thereof with a long clutch-pinion D', running loosely upon a short spindle $d$, having a clutch-face $d'$, which engages with an opposing clutch-face $d^2$ upon the hub of a bevel-gear E, also mounted loosely on the same spindle. This gear in turn engages with a bevel-pinion E', pinned or keyed to the rear end of the crank-shaft just beneath and behind the axle, thus communicating motion to the pitman F and through it to the cutter-bar or sickle. The clutch-pinion has its end opposite the clutch-face turned into a hub and grooved, as at $g$, to receive a flange $g'$ from a shipper-case G, cut away at one side, so as to be slipped over said hub, and having trunnions $g^2$, which engage the forked ends of the shipper G', pivoted to the main frame.

Heretofore the connection between the shipper and the pinion has been by means of a yoke consisting, essentially, of a cut-away rim having the outline exhibited by the flange $g'$ and with trunnions attached, as herein shown; but such construction caused much wear upon the groove in the pinion-hub, so as to cause the clutch to become unreliable in a short time, and, moreover, it was a disadvantageous mode of communicating power to the pinion, and for this reason I have adopted the case form shown, whereby a cap $g^3$ is obtained which comes against the end of the hub and is bored, as at $g^4$, to match the bore in the pinion, and thus receive or slip over the spindle with said pinion. Between the flange and the cap is a space corresponding to the head or enlargement left at the end of the pinion-hub, and forming in effect a groove $g^5$, which receives said head.

When assembling the parts of the machine, the shipper-case is first slipped into position on the pinion-hub, and then the case and pinion are placed upon the spindle, which thus locks them together, but does not prevent the case from revolving about the hub of the pinion, this being done, as with the ordinary yoke, by means of the forked arms of the shipper, one of which receives the upper and the other the lower trunnion.

H represents the coupling-arm, at its inner end universally jointed to the under side of the crank-shaft sleeve and at its outer end forked and connected to the inside shoe of the finger-bar by two pivot-pins $h\ h'$, one passing through the front arm of the fork and lugs from the front of said shoe and the other through the rear arm of the fork and lugs from the heel of the shoe.

A spring $H'$ is secured to the draft-tongue above or adjacent to the coupling-arm and connected therewith and arranged to act in such direction as to tend to lift the coupling-arm, thus easing it and the finger-bar, and also aiding the driver when he raises the frame by means of the ordinary lifting-lever. In the third figure of the drawings this easing-spring is shown as coiled around a pin $h^2$, supported in hangers $H^2$, bolted to the draft-tongue and serving as a pivot for an arm $H^3$, from the outer end of which depends a chain $h^3$ to a connection with the coupling-bar beneath.

Lugs $h^4$ from the pivoted arm serve as seats for one end of the coiled spring, whereby its stress may be adjusted, while the other end is braced against the under side of the draft-tongue. Instead, however, of a coiled spring, a plate-spring may be employed, as shown in the ninth and tenth figures, its forward end then being bolted to the draft-tongue somewhat in advance of the coupling-bar, and its rear end secured to said coupling-bar by means of eyebolts $h^5$, or in any other manner that will properly compensate for the endwise thrust of the spring when the bar is raised.

The outer end of the finger-bar tends to sag and dig into the ground, as it cannot well be supported from the mower. To prevent this tendency so far as may be, I interpose a spring between the coupling-arm and the heel of the finger-bar, arranged to press upon said heel inside of the pivotal axis between it and the coupling-bar. Such a spring is represented at I, coiled about the pivot-pin which connects the forked end of said bar with the heel of the inner shoe, one arm $i$ of this spring extending up and bearing against the inner edge of the fork, while the other arm $i'$ extends down and inward and bears against the heel of the finger-bar, thus exerting a constant force, tending to depress said heel, vibrate the bar on its pivot, and lift the outer end of the divider.

A thrust-bar K is, as usual, pivoted to a hanger from the main frame in rear of the axle and extends forward over the coupling-bar, then is bent down, and has at its extreme end a vertical or nearly vertical slot $k$, in which the stub-axle of the lead-wheel $K'$ is secured and adjusted up and down. From this thrust-bar, in rear of the coupling-arm, depends a hanger $k'$, in which is pivoted an elbow-lever L, the lower or horizontal arm of which is riveted to the coupling-bar, while the upper arm is link-connected with the tilting-lever M in rear of the axle. Heretofore this tilting-lever has either latched into a segment to hold the finger-bar rigidly against rocking in any adjusted position upon its longitudinal axis or else has been so connected with the bar as when locked in position to permit the bar to rock within certain limits. I now propose to connect it with its locking-rack in such manner and by such means that it may either lock the bar rigidly against a rocking or tilting movement or may allow it such rocking or tilting movement within given and variable limits, or may leave it free to lock without control. To this end I make the locking-rack N eccentric to the axis of the lever and form it with ratchet-teeth $n$, which at their re-entrant angles are cut down to afford square sockets $n'$ for the square nose of the detent-pawl $n^2$, which, as usual, is link-connected to a latch-piece $N'$ adjacent to the hand-hold of the lever and is spring-pressed into engagement, but now has its heel extended to the rear of the lever and provided with a set-screw $n^3$, which may be turned in or out nearer to or farther from the lever. When turned in against the lever sufficiently to raise the nose of the pawl out of engagement with the socket behind the front tooth, the pawl will ride over the ratchet-crown of the adjacent tooth and snap in behind it, but will escape all subsequent rear teeth, which will be relatively lower in the rack or receding from the arc in which the nose of the pawl moves. Therefore, the finger-bar will be free to tilt within any range which carries the pawl to the rear of the second tooth from the front, but cannot drop as to the point of its cutters below a plane limited by that tooth. Another slight change of adjustment of the set-screw away from the lever will lower the pawl sufficienty to cause it to snap behind the third tooth to the rear, still further limiting the tilting movement of the finger-bar—that is, stopping it when the points of its guard-fingers are yet higher above the ground than before. When the nose of the pawl has been lowered, so that it will engage with the rear socket of the rack, it may be engaged with any socket therein, thus locking the finger-bar in any desired tilting adjustment. Finally, if the set-screw is turned in so far that the nose of the dog is lifted from engagement with any tooth in the ratchet the finger-bar will be free to tilt uncontrolled except by the inequalities of the ground.

To the thrust-bar in advance of the axle adjacent to the coupling-bar is bolted a clevis $o$, from which a draft-rod O extends diagonally inward and upward to a connection with the doubletree. In former machines this connection has been with a stirrup upon the draft-tongue, to which stirrup the doubletree O' was attached, so that the forward draft of the team would draw upon the link and tend to raise the thrust-bar, and with it the coupling-arm and their attachments. Instead of this stirrup, I now bolt a plate P to the upper side of the draft-tongue, having at the side adjacent to the thrust-bar a keeper $p$ and at the other end receiving a pivot-pin $p'$, which secures a lever P', that passes through and plays in the keeper. The outer end of this lever has a hook $p^2$, or is otherwise properly formed to receive the end of the draft-link, and is perforated above the plate to receive a bolt confining the rear end of the hammer-strap P², by which the doubletree is connected. Preferably a series of perforations $p^3$ are formed, as shown, that the doubletree may be set to one side or the other to lighten side draft.

For the purpose of positively controlling the height of the coupling-frame an ordinary lifting-lever R may be employed, mounted in bearings on the main frame and latching into a rack R' thereon, its lowest end being provided with a segment $r$ and connected by a chain $r'$ with the thrust-bar at any suitable point—for instance, at or near the point where the draft-link is attached thereto.

The suspension of the floating coupling-frame and the hinged bar from the draft-tongue or other rigid part or extension of the main frame by means of the lever, spring, and flexible connection herein shown and described, or equivalents thereof, has been made the subject of a divisional application filed in the Patent Office of the United States on the 15th day of July, 1889, Serial No. 317,618, and hence I make no claim to such arrangement or combination herein; but What I do claim, and desire to secure by Letters Patent, is—

1. The combination, substantially as hereinbefore set forth, of the clutch-pinion, the shipper-case capping the end of its hub and having a flange embracing a groove therein, and the shipper connected with said case.

2. The combination, substantially as hereinbefore set forth, of the clutch-pinion, the trunnioned shipper-case capping the end of its hub and having a flange embracing a groove therein, and the shipper-lever pivoted to the main frame and having forks engaging the trunnions from the case and steadying it against revolution.

3. The combination, substantially as hereinbefore set forth, of the clutch-pinion, the spindle on which it is mounted, the shipper-case provided with trunnions and having a flange to enter a groove in the hub of said pinion, and a cap to embrace its end and bored through its cap in line with the bore through the pinion to receive the spindle, whereby the latter serves to unite them together, and the shipper-lever having forked ends to engage with the trunnions from the case.

4. The combination, substantially as hereinbefore set forth, with the finger-beam and thrust-bar, of the draft-link connected at its rear end to said thrust-bar, the draft-lever pivoted to the farther side of the draft-tongue and extending thereacross, and at its free end connected with said link, the doubletree, and means whereby said doubletree and draft-lever may be connected at different points along the lever.

5. The combination, substantially as hereinbefore set forth, of the finger-beam, the thrust-bar, the draft-rod connected at its rear end to said thrust-bar, the plate P, secured to the top of the tongue and having the keeper $p$, the draft-lever pivoted to the farther side of said plate and projecting through the keeper and hooking into the front end of the draft-rod, and the doubletree connected to said draft-lever.

6. The combination, substantially as hereinbefore set forth, with the rocking finger-beam, of detent mechanism which holds it rigidly against rocking and an adjustable stop whereby said detent mechanism may be thrown out of action to permit the finger-beam to float and rock freely.

7. The combination, substantially as hereinbefore set forth, with the rocking finger-bar, of the tilting-lever, its eccentric detent-bar, the detent-pawl, and means whereby said detent-pawl may be limited in its fall that it may engage with a greater or less number of teeth toward one end of the rack, while escaping the remaining teeth of said rack.

8. The combination, substantially as hereinbefore set forth, with the rocking finger-beam, of the tilting-lever, its eccentric detent-rack formed with ratchet-teeth cut away at their re-entrant angles or bases to afford square sockets, the detent-pawl having a square nose to enter said sockets, and the adjusting-screw passing through the heel of said detent-pawl and bearing against the lever to determine the distance to which the pawl may fall.

9. The combination, substantially as hereinbefore set forth, of the lever M, the eccentric detent-rack N, having ratchet-teeth $n$, cut away to present square sockets $n'$ at their bases, the detent-pawl $n^2$, pivoted to the lever and having a square nose to enter said sockets, and the set-screw $n^3$, passing through the heel of said pawl and bearing against the lever to limit the descent of the pawl that it may escape one or more teeth of the eccentric rack.

WILLIAM R. BAKER.

Witnesses:
ALICE S. WELLS,
LEONARD VASSALL.